United States Patent
Hazelton et al.

[11] Patent Number: 5,892,312
[45] Date of Patent: Apr. 6, 1999

[54] BOBBIN FOR INSULATING AN ELECTRIC MOTOR STATOR AND METHOD FOR MAKING SAME

[75] Inventors: Thomas James Hazelton, Hiram; David Dwayne Norman, Smyrna, both of Ga.

[73] Assignee: Electrical Insulation Suppliers, Inc., Atlanta, Ga.

[21] Appl. No.: 869,198

[22] Filed: Jun. 4, 1997

[51] Int. Cl.[6] .............................. H02K 1/04; H02K 3/32; H02K 3/30; H02K 15/10
[52] U.S. Cl. .............................. 310/194; 310/42; 310/43
[58] Field of Search .................... 310/194, 215, 310/42, 43; 336/198, 208

[56] References Cited

U.S. PATENT DOCUMENTS

| | | | |
|---|---|---|---|
| 1,481,190 | 1/1924 | Durbin et al. | 310/194 |
| 3,339,097 | 8/1967 | Dunn | 310/194 |
| 4,188,555 | 2/1980 | Suzuki et al. | 310/162 |
| 4,639,628 | 1/1987 | Kobayashi et al. | 310/194 |
| 4,675,566 | 6/1987 | Nystuen et al. | 310/254 |
| 4,987,331 | 1/1991 | Horng | 310/254 |
| 5,057,732 | 10/1991 | Fukaya | 310/208 |
| 5,073,735 | 12/1991 | Tagaki | 310/71 |
| 5,093,599 | 3/1992 | Horng | 310/254 |
| 5,406,158 | 4/1995 | Arnold et al. | 310/692 |
| 5,465,020 | 11/1995 | Peterson | 310/194 |

*Primary Examiner*—Clayton LaBalle
*Attorney, Agent, or Firm*—Jones & Askew, LLP

[57] ABSTRACT

A bobbin insulating and electric motor stator form an adjacent wire coil is made from a bobbin assembly including a first part and a second part, both formed of a dielectric thermal vacuum formable polymer. The first part includes a first flange and first tube extending integrally from the first flange. The second part includes a second flange and a second tube extending integrally from the second flange. The first and second tubes are sized and shaped so as to be engageable together to form an endless winding surface between the first and second flanges. The first and second parts are made with thermal vacuum techniques to be very thin. The thickness of the first and second parts ranges from 2 to about 25 mils, more desirably 2 to about 15 mils, still more desirably 2 to about 10 mils, and most desirably 2 to about 7 mils.

13 Claims, 1 Drawing Sheet

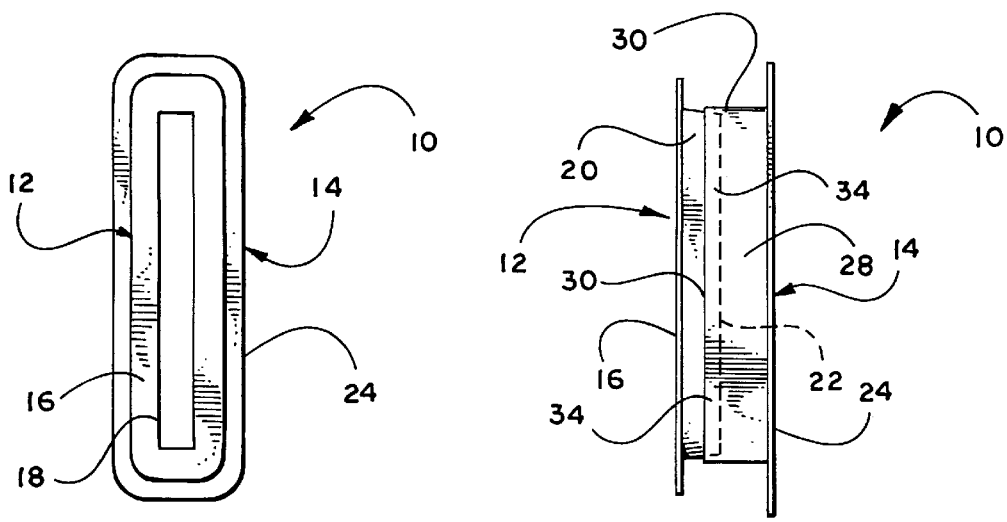
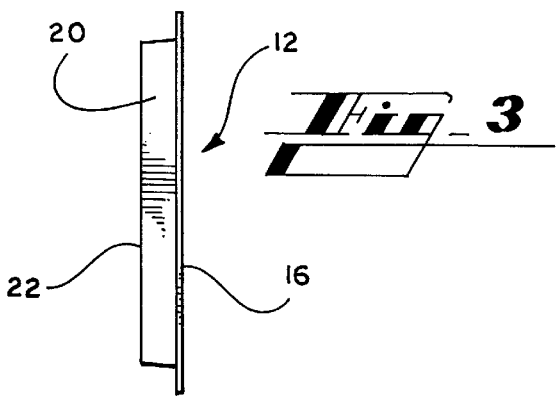
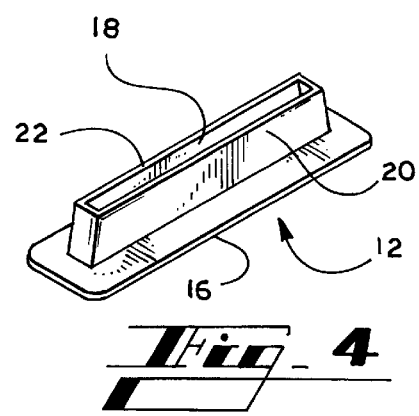
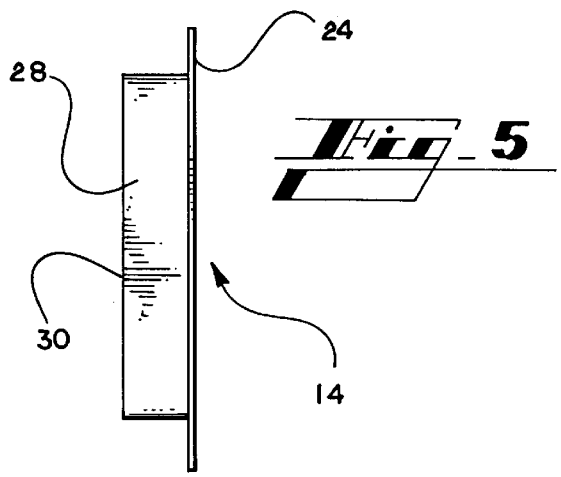
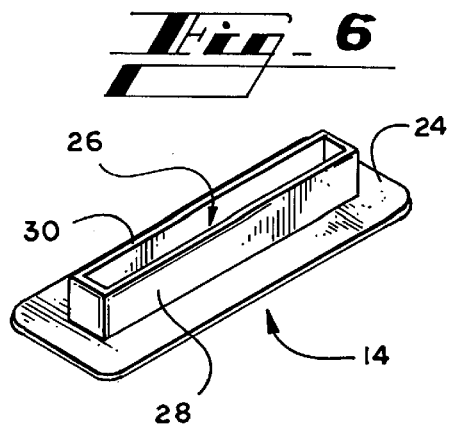

BOBBIN FOR INSULATING AN ELECTRIC MOTOR STATOR AND METHOD FOR MAKING SAME

TECHNICAL FIELD

This invention relates to electric motors and, more particularly, relates to thin polymer insulating bobbins for electric motors.

BACKGROUND OF THE INVENTION

Electric motors typically include a rotor and a stator. An electric motor stator typically has a plurality of fingers with copper wire wound about the fingers. Electric current flowing through the copper windings causes the rotor to rotate within the stator.

Copper windings in an electric motor must be insulated from the stator, which is typically made of metal. This insulation is normally a bobbin made of dielectric material. The bobbin is placed about the stator finger and the wire coil is wound about the bobbin.

Normally, electric motor insulating bobbins have a pair of opposing flanges connected by a tube which is an endless winding surface. The wire coil is wound about the winding surface of the bobbin between the opposing flanges. Insulating bobbins are made of a dielectric material which can withstand heat produced by the electric motor without melting or otherwise degrading. Paper products and dielectric polymers are used to form insulating bobbins.

Normally, it is desirable to maximize the horsepower produced by a given size electric motor. The greater amount of copper winding in an electric motor, the greater the horsepower produced by the motor. Thus, it is desirable to pack as much copper winding as possible in a given size electric motor. One way of providing more room in an electric motor is by using a thin bobbin. Thin polymer bobbins are made with injection molding techniques to have a thickness as low as about 35 mils. Nevertheless, a thinner polymer bobbin is desirable to produce electric motors having even higher horsepower output for a given size motor.

SUMMARY OF THE INVENTION

The present invention solves the above described problems by providing a bobbin assembly made of dielectric thermal vacuum formable polymer using thermal vacuum forming techniques. The thermal vacuum forming techniques allow the production of a very thin bobbin.

More particularly, the bobbin assembly of the present invention includes a first part including a first flange and a first tube and a second part including a second flange and a second tube. The first and second tubes are sized and shaped so as to be engageable together to form an endless winding surface between the first and second flanges. The first flange defines a first central opening and the first tube extends integrally from the first flange about the first central opening to an open end. Likewise, the second flange defines a second central opening and the second tube extends integrally from the second flange about the second central opening to an open end. The first and second tubes are engaged together and attached to form the bobbin.

The first tube of the bobbin assembly is desirably tapered inwardly from the first flange to the open end of the first tube and sized and shaped so as to be slidably engageable within the second tube to form the endless winding surface. Suitable means for attaching the first tube to the second tube includes welding the first tube to the second tube such as by ultrasonic spot welding. Tape and other forms of adhesive also may be used to attach the first tube to the second tube.

The first and second parts of the bobbin are desirably made with thermal vacuum forming techniques to have a thickness within a range from about 2 to about 25 mils. More desirably, the first and second parts of the bobbin have a thickness within a range from about 2 to about 15 mils, still more desirably have a thickness within the range from about 2 to about 10 mils, and most desirably have a thickness within a range from about 2 to about 7 mils.

Accordingly, the present invention also encompasses a method for making a bobbin comprising the steps of forming a first part of a dielectric thermal vacuum formable polymer using thermal vacuum forming and forming a second part of a dielectric thermal vacuum formable polymer using thermal vacuum forming, and attaching the parts together. More particularly, the method includes the steps of cutting an opening in the end of the first tube of the first part and cutting an opening in the end of the second tube of the second part and attaching the first and second tubes together to form an endless winding surface between the first and second flanges.

Accordingly, an object of the present invention is to provide a thinner dielectric polymer bobbin for insulating an electric motor stator from an adjacent wire winding.

Another object of the present invention is to provide a thinner bobbin for making an electric motor with additional wire winding and a higher power output.

Still other objects, features, and advantages of the present invention will become apparent upon review of the following detailed description of embodiments of the invention when taken in conjunction with the accompanying drawings and the appended claims.

BRIEF DESCRIPTION OF DRAWINGS

FIG. 1 is an end elevation view of an insulating bobbin made in accordance with an embodiment of the present invention.

FIG. 2 is a side elevation view of the bobbin shown in FIG. 1.

FIG. 3 is a side elevation view of a first part which forms a portion of the bobbin shown in FIG. 1.

FIG. 4 is a perspective view of the first part shown in FIG. 3.

FIG. 5 is a side elevation view of a second part of the bobbin illustrated in FIG. 1.

FIG. 6 is a perspective view of the second part illustrated in FIG. 5.

DETAILED DESCRIPTION OF DRAWINGS

As summarized above, the present invention encompasses a bobbin for insulating electric motor stators and a method for making such a bobbin. Below, an embodiment of the present invention is described in detail, followed by a description of the method for making the bobbin.

Referring now in more detail to the drawings, in which like numerals refer to like parts throughout the several views, FIGS. 1 and 2 illustrate a bobbin 10 generally comprising a first part 12 attached to a second part 14. Prior to attaching the first and second parts 12 and 14, the first and second parts can described as a bobbin assembly.

The first part 12 of the bobbin 10 comprises a first flange 16 defining a first central opening 18 and a first tube 20 extending integrally from the first flange about the central opening to an open end 22. The first tube 20 tapers inwardly from the first flange 16 to the open end 22 of the first flange. The first flange 16, the first central opening 18, and the first tube 20 are generally rectangular in shape; however, it should be understood that the first part and the bobbin generally can have various other shapes including circular, oval, and square. The shape of the bobbin will depend on the shape of the stator which is to be insulated.

The second part 14 is similar in construction to the first part 12, except that the second part includes a second flange 24 which is larger than the first flange 16. The second flange 24 of the second part 14 defines a second central opening 26 and the second part includes a second tube 28 extending integrally from the second flange about the second central opening to an open end 30. The second tube 28 does not taper inwardly, but instead forms a straight passage through the second part 14.

Like the first part 12, the second part is substantially rectangular in shape, but can take other forms. The second flange 24, the second central opening 26, and the second tube 28 are all rectangular.

The bobbin 10 is completed by inserting the tapered first tube 20 of the first part 12 through the open end 30 of the second tube 28 and into the second tube, so that the first flange 16 and the second flange 24 oppose one another and the first and second tubes form an endless winding surface 32 between the first and second flanges. The first and second tubes 20 and 28 are desirably attached to one another by suitable means such as welding, taping, or adhesives. In FIG. 2, the first and second tubes 20 and 28 are attached with ultrasonic spot welds 34.

The first and second parts 12 and 14 of the bobbin 10 are made very thin via thermal vacuum forming techniques. The first and second parts 12 and 14 desirably have a thickness within a range from about 2 to about 25 mils. More desirably, the first and second parts 12 and 14 have a thickness within a range from about 2 to about 15 mils, even more desirably within a range from about 2 to about 10 mils, and still more desirably within a range from about 2 to about 7 mils. The thickness of the first and second parts 12 and 14 will depend on the application. Also, the thickness of the first and second tubes 20 and 28 tend to be less than the thickness of the flanges 16 and 24. In a preferred embodiment, the tubes 20 and 28 have a thickness of about 3.5 mils and the flanges 16 and 24 have a thickness of about 7 mils.

Accordingly, the first and second parts 12 and 14 of the bobbin 10 are made from dielectric thermal vacuum formable polymer. Suitable dielectric thermal vacuum formable polymers include VALOX FR-1 polyester/polycarbonate copolymer available from GE Plastics of Pittsfield, Mass. Other suitable dielectric thermal vacuum formable polymers include LEXAN polycarbonate film available from GE Plastics, LEXAN FR700 and FR701 grade flame retardant polycarbonate film available from GE Plastics, ULTEM thermoplastic polyethermide, particularly ULTEM 5011, available from GE Plastics, KAPTON polyimide film, particularly grades JP, HN, and HA, available from DuPont Plastics in Circleville, Ohio, NOMEX aramid paper, particularly NOMEX 410 and 411, available from DuPont in Wilmington, Del., MYLAR polyester film, particularly MYLAR-A, available from DuPont in Wilmington, polyethylene naphthalate (PEN), and thermoplastic polyester. The particular polymer used depends on the requirements of the electric motor with which the bobbin is to be used. Factors to consider in selecting the polymer include the motor voltage, amperage, heat produced, and horsepower.

The first and second parts 12 and 14 of the bobbin 10 are made using conventional thermal vacuum forming techniques. Using appropriately shaped molds, which may be chilled or heated depending on the particular polymer used, a sheet of the thermal vacuum formable polymer is heated to the softening point of the polymer and then pulled over the molds for the first and second parts 12 and 14 with a vacuum or positive air pressure over the mold, or both. After the polymer has rehardened, the first and second parts 12 and 14 are trimmed to remove flash and to cutout the open ends of the first and second tubes 20 and 28. The first and second parts 12 and 14 are trimmed with a steel rule die.

The formed first and second parts 12 and 14 can be formed into the bobbin 10 before or after installation on an electric motor stator. To attach the first and second parts 12 and 14, the tapered first tube 20 is inserted through the open end 30 of the second tube 28 and into the second tube, and then the first and second tubes are adhered to one another as described above. The bobbin end is mounted on an electric stator simply by sliding the bobbin 10 over the stator arm so that the stator arm extends through the winding surface 32 formed by the first and second tubes 20 and 28. A wire coil can then be wound about the endless winding surface 32. The bobbin 10 insulates the metal stator from the wire winding.

The bobbin 10 is particularly advantageous with electric motors because the bobbin 10 can be made very thin. The reduced thickness of the bobbin 10 relative to conventional polymer bobbins leaves more space about the stator for additional wire windings. With additional wire windings, the same size electric motor can produce greater horsepower. For example, the bobbin 10 can allow space for enough additional copper winding in a normally 0.5 horsepower motor to achieve 0.75 horsepower.

The foregoing description only relates to embodiments of the present invention, and numerous changes and modifications may be made therein without departing from the scope of the invention as defined in the following claims.

We claim:

1. A bobbin assembly for insulating an electric motor stator from an adjacent wire coil, comprising:

a first part including a first flange defining a first central opening and a first tube extending integrally from the first flange about the first central opening to an open end; and a second part including a second flange defining a second central opening and a second tube extending integrally from the second flange about the second central opening to an open end, the first and second parts being formed of a dielectric thermal vacuum formable polymer using thermal vacuum forming and the first and second tubes being sized and shaped so as to be engageable together to form an endless winding surface between the first and second flanges.

2. A bobbin assembly as in claim 1 wherein the first and second parts have a thickness within a range from about 2 to about 25 mils.

3. A bobbin assembly as in claim 1 wherein the first and second parts have a thickness within a range from about 2 to about 15 mils.

4. A bobbin assembly as in claim 1 wherein the first and second parts have a thickness within a range from about 2 to about 10 mils.

5. A bobbin assembly as in claim 1 wherein the first and second parts have a thickness within a range from about 2 to about 7 mils.

6. A bobbin assembly as in claim 1 wherein the first tube is tapered inwardly from the first flange to the open end of the first flange and sized and shaped so as to be slidably engageable within the second tube to form the endless winding surface.

7. A bobbin for insulating an electric motor stator from an adjacent wire coil, comprising:

a first part including a first flange defining a first central opening and a first tube extending integrally from the first flange about the first central opening to an open end; and a second part including a second flange defining a second central opening and a second tube extending integrally from the second flange about the second central opening to an open end, the first and second parts being formed of a dielectric thermal vacuum formable polymer using thermal vacuum forming and the first and second tubes being engaged together to form an endless winding surface between the first and second flanges.

8. A bobbin as in claim 7 wherein the first and second parts have a thickness within a range from about 2 to about 25 mils.

9. A bobbin as in claim 7 wherein the first and second parts have a thickness within a range from about 2 to about 15 mils.

10. A bobbin as in claim 7 wherein the first and second parts have a thickness within a range from about 2 to about 10 mils.

11. A bobbin as in claim 7 wherein the first and second parts have a thickness within a range from about 2 to about 7 mils.

12. A bobbin as in claim 7 wherein the first tube is tapered inwardly from the first flange to the open end of the first flange and slidably engaged within the second tube to form the endless winding surface.

13. A bobbin as in claim 12 wherein the first tube is welded to the second tube.

* * * * *